United States Patent
Kaminski

(10) Patent No.: US 10,815,063 B2
(45) Date of Patent: Oct. 27, 2020

(54) BELT TENSIONER WITHOUT TENSION ROLLER REMOVAL ON X-RAY MACHINES

(71) Applicant: Mettler-Toledo, LLC, Columbus, OH (US)

(72) Inventor: Kamil Kaminski, Cambridgeshire (GB)

(73) Assignee: METTLER-TOLEDO, LLC, Columbus, OH (US)

( * ) Notice: Subject to any disclaimer, the term of this patent is extended or adjusted under 35 U.S.C. 154(b) by 0 days.

(21) Appl. No.: 16/291,519

(22) Filed: Mar. 4, 2019

(65) Prior Publication Data

US 2020/0283235 A1    Sep. 10, 2020

(51) Int. Cl.

| | |
|---|---|
| *B65G 21/10* | (2006.01) |
| *B65G 23/44* | (2006.01) |
| *B65G 21/20* | (2006.01) |
| *G01N 21/84* | (2006.01) |

(52) U.S. Cl.
CPC ......... *B65G 21/10* (2013.01); *B65G 21/2045* (2013.01); *B65G 23/44* (2013.01); *B65G 2203/0208* (2013.01); *B65G 2203/04* (2013.01); *B65G 2812/02168* (2013.01); *G01N 2021/845* (2013.01); *G01N 2223/643* (2013.01)

(58) Field of Classification Search
CPC .... B65G 23/44; B65G 21/10; B65G 2203/04; B65G 2203/0208; G01N 2223/643; G01N 2021/845; G01N 21/84
USPC ............................................ 198/813, 810.04
See application file for complete search history.

(56) References Cited

U.S. PATENT DOCUMENTS

| 2,907,450 | A | * | 10/1959 | Reid | ...................... | B65G 23/44 |
|---|---|---|---|---|---|---|
| | | | | | | 198/810.04 |
| 3,456,776 | A | * | 7/1969 | Viene | ..................... | B65G 23/44 |
| | | | | | | 198/813 |
| 4,561,538 | A | * | 12/1985 | Zwiebel | ................. | B65G 23/44 |
| | | | | | | 198/816 |
| 4,846,338 | A | * | 7/1989 | Widmer | ................. | B65G 15/00 |
| | | | | | | 198/831 |
| 5,022,514 | A | * | 6/1991 | Lofberg | ................. | B65G 15/00 |
| | | | | | | 198/813 |
| 6,512,812 | B2 | | 1/2003 | Watanabe | | |
| 6,695,124 | B2 | * | 2/2004 | Nixon | ..................... | B65B 31/02 |
| | | | | | | 198/588 |
| 6,843,365 | B2 | * | 1/2005 | Baker | .................... | B65G 47/54 |
| | | | | | | 198/813 |
| 7,257,351 | B2 | | 8/2007 | Tachiki et al. | | |

(Continued)

FOREIGN PATENT DOCUMENTS

| EP | 0312643 A1 | 4/1989 |
|---|---|---|
| JP | H11194104 A | 7/1999 |

*Primary Examiner* — James R Bidwell
(74) *Attorney, Agent, or Firm* — Buchanan Ingersoll & Rooney PC

(57) ABSTRACT

Disclosed is an apparatus including a frame configured to support a conveyor system having a conveyor belt. The apparatus can include a carriage configured to support a conveyor tension roller, the carriage being fastened to the frame to allow the carriage to be transitioned to and from an engaging position and a disengaging position. The engaging position can be a position at which the conveyor tension roller will contact with the conveyor belt when installed, and the disengaging position can be a position at which the conveyor tension roller will not making contact with the conveyor belt when installed.

19 Claims, 6 Drawing Sheets

(56) References Cited

U.S. PATENT DOCUMENTS

| | | | |
|---|---|---|---|
| 7,549,531 B2* | 6/2009 | Hosch | B65G 21/105 |
| | | | 198/493 |
| 8,469,182 B2 | 6/2013 | Alotto | |
| 9,546,045 B2* | 1/2017 | Franzaroli | B65G 21/06 |
| 9,694,982 B2 | 7/2017 | Haas et al. | |
| 2013/0264176 A1* | 10/2013 | Knas | B65G 23/10 |
| | | | 198/835 |

* cited by examiner

BELT TENSIONER WITHOUT TENSION ROLLER REMOVAL ON X-RAY MACHINES

FIELD

Embodiments can include a carriage having a conveyor tension roller, the carriage being fastened to a frame configured to support a conveyor system. The carriage can be configured to be transitioned to and from an engaging position and a disengaging position so as to allow removal of a conveyor belt from the conveyor system without detaching the carriage from the frame or detaching the conveyor tension roller from the carriage.

BACKGROUND INFORMATION

Known conveyor systems, belt tensioner systems, and method for maintaining the same can be appreciated from U.S. Pat. Nos. 7,257,351, 8,469,182, 9,694,982, 6,512,812, EP 0312643, and JP 11194104. Known systems can be limited in that they require removal of the conveyor tensioner roller and/or disassembly of the conveyor tensioner roller to access and/or maintain the conveyor belt.

SUMMARY

Embodiments of an apparatus can include a frame configured to support a conveyor system having a conveyor belt. The apparatus can include a carriage configured to support a conveyor tension roller, the carriage being fastened to the frame to allow the carriage to be transitioned to and from an engaging position and a disengaging position. In some embodiments, the engaging position can be a position at which the conveyor tension roller will contact with the conveyor belt when installed. In some embodiments, the disengaging position can be a position at which the conveyor tension roller will not making contact with the conveyor belt when installed.

Embodiments of an inspection system can include an inspection unit. The inspection system can include a conveyor system including a conveyor bed configured to house a conveyor drive roller and a conveyor belt such that each of the conveyor drive roller and the conveyor belt occupy a volume of space inside the conveyor bed. The conveyor system can be configured so that objects placed on the conveyor belt will be passed through an inspection field of the inspection unit. The inspection system can include a frame configured to support the conveyor system, the frame occupying a volume of space outside of the conveyor bed. The inspection system can include a carriage configured to support a conveyor tension roller, the carriage being fastened to the frame to allow the carriage to be transitioned to and from an engaging position and a disengaging position. In some embodiments, the engaging position can be a position at which the conveyor tension roller will be within the volume of space inside the conveyor bed when installed. In some embodiments, the disengaging position can be a position at which the conveyor tension roller will be within the volume of space outside the conveyor bed when installed.

Some embodiments can include a method for maintaining an apparatus having a removable conveyor belt, wherein the apparatus includes a frame having a carriage with a tension roller, the frame being configured to support a conveyor system, the conveyor system having a conveyor bed configured to house a conveyor drive roller and the removable conveyor belt. The method can involve transitioning the carriage to an engaging position via a pivot motion about the frame to impose a tensioning force on the conveyor belt.

BRIEF DESCRIPTION OF THE DRAWINGS

Other features and advantages of the present disclosure will become more apparent upon reading the following detailed description in conjunction with the accompanying drawings, wherein like elements are designated by like numerals, and wherein.

DETAILED DESCRIPTION

Figure 1:
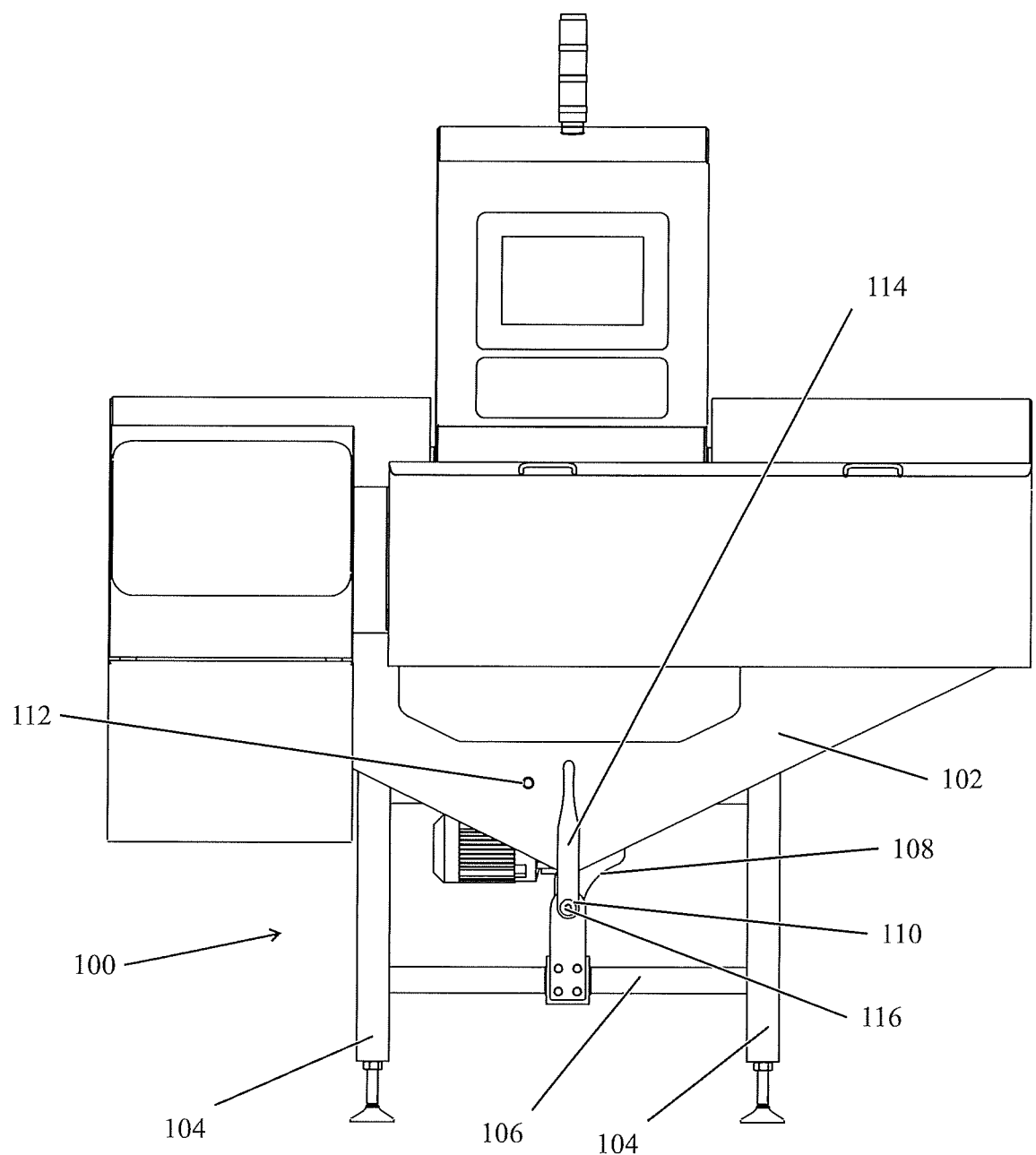
FIG. 1 shows an exemplary front view of an embodiment of the apparatus with an embodiment of the carriage in an exemplary engaged position.
Figure 2:
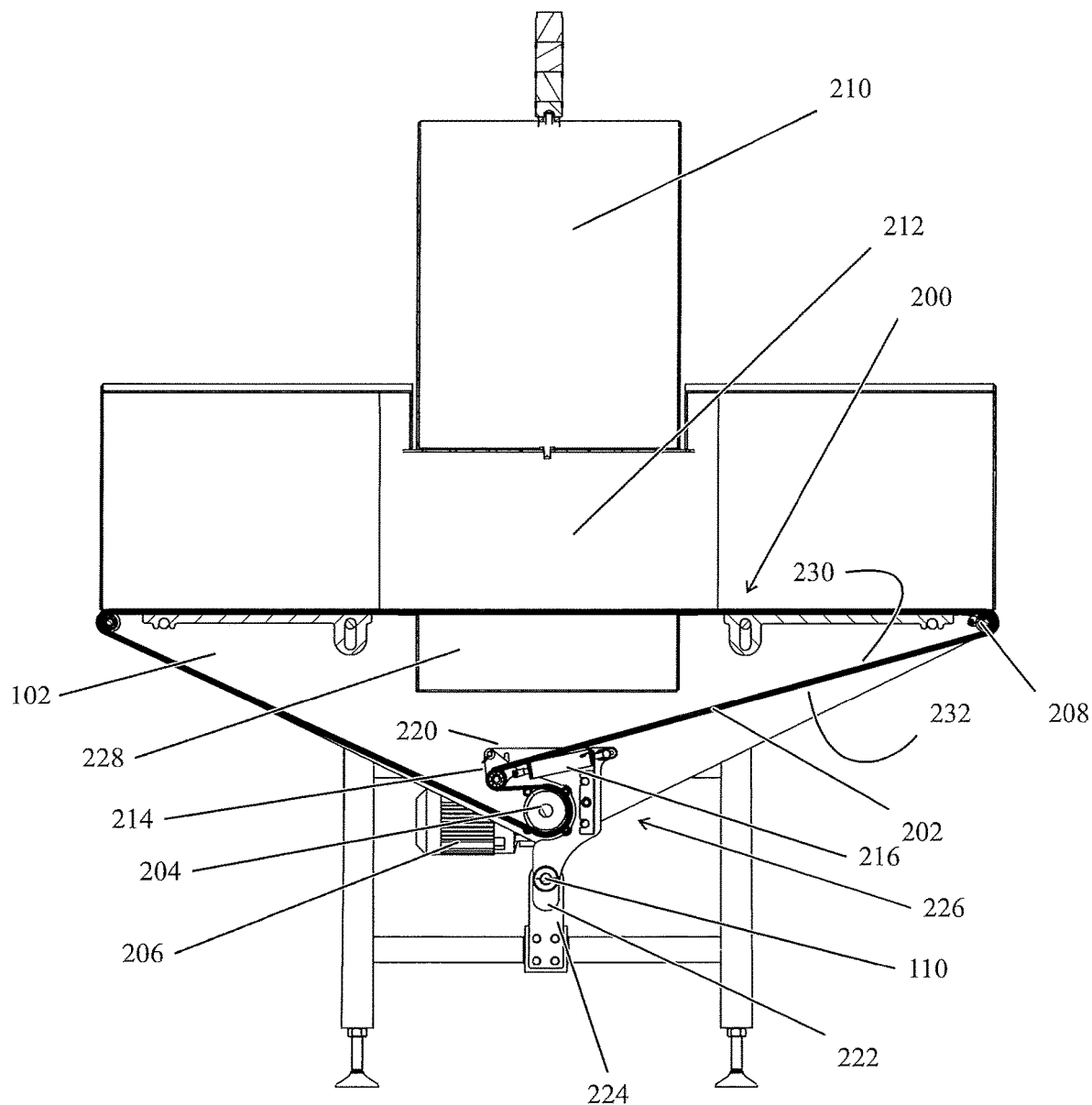
FIG. 2 shows an exemplary cross-sectional view of an embodiment of the apparatus with an embodiment of the carriage in an exemplary engaged position.
Figure 3:
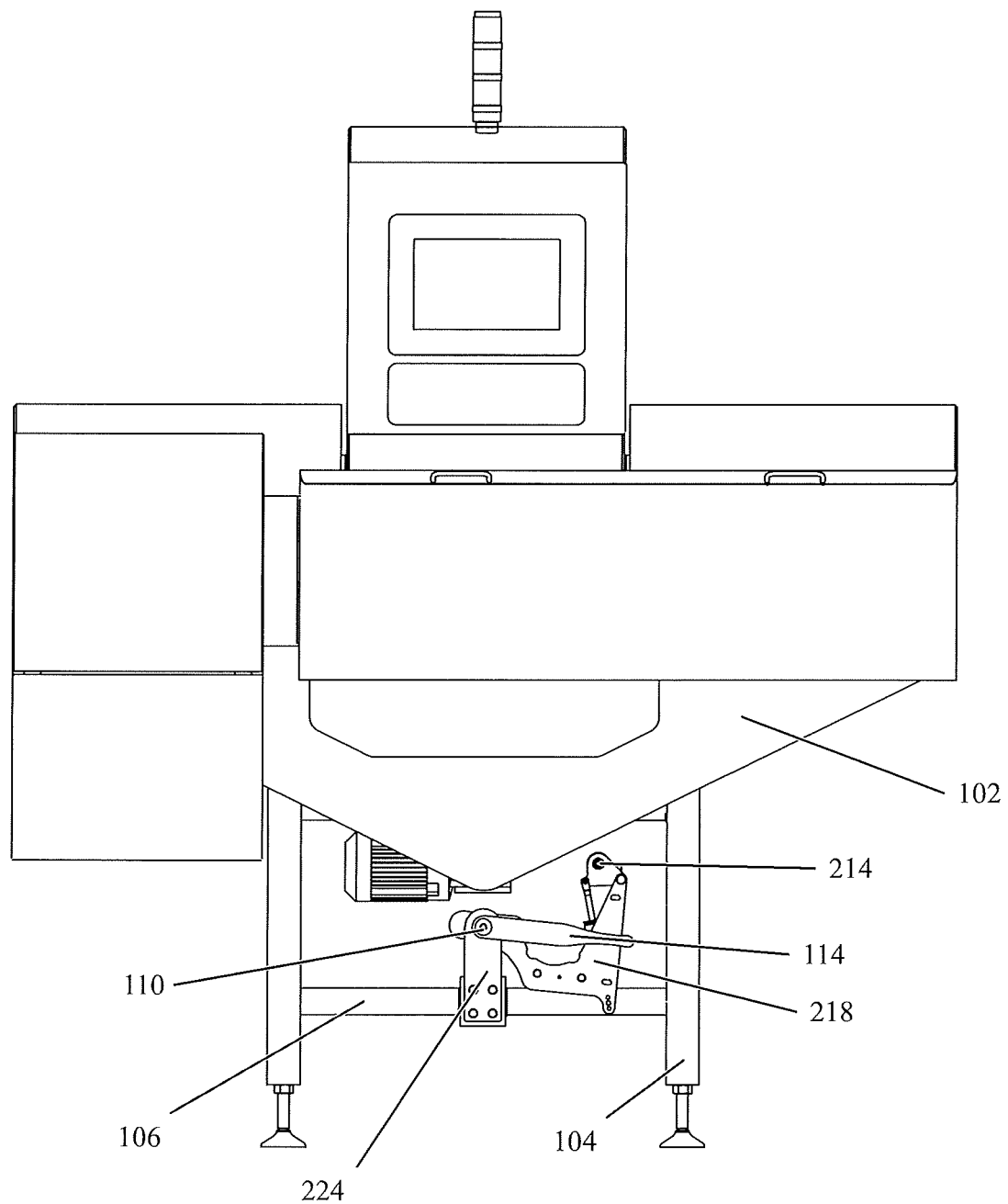
FIG. 3 shows an exemplary front view of an embodiment of the apparatus with an embodiment of the carriage in an exemplary disengaged position.
Figure 4:
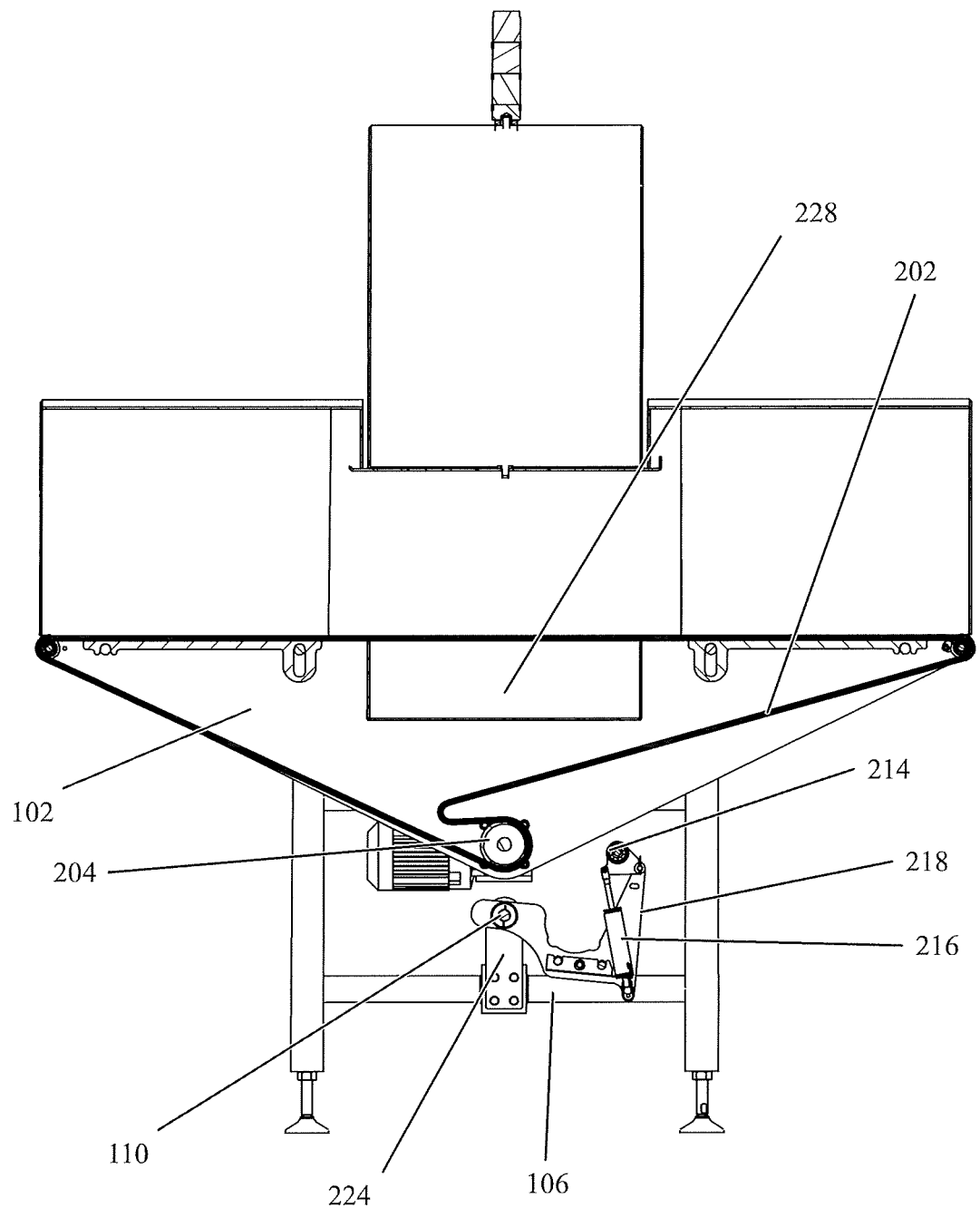
FIG. 4 shows an exemplary cross-sectional view of an embodiment of the apparatus with an embodiment of the carriage in an exemplary disengaged position.
Figure 5:
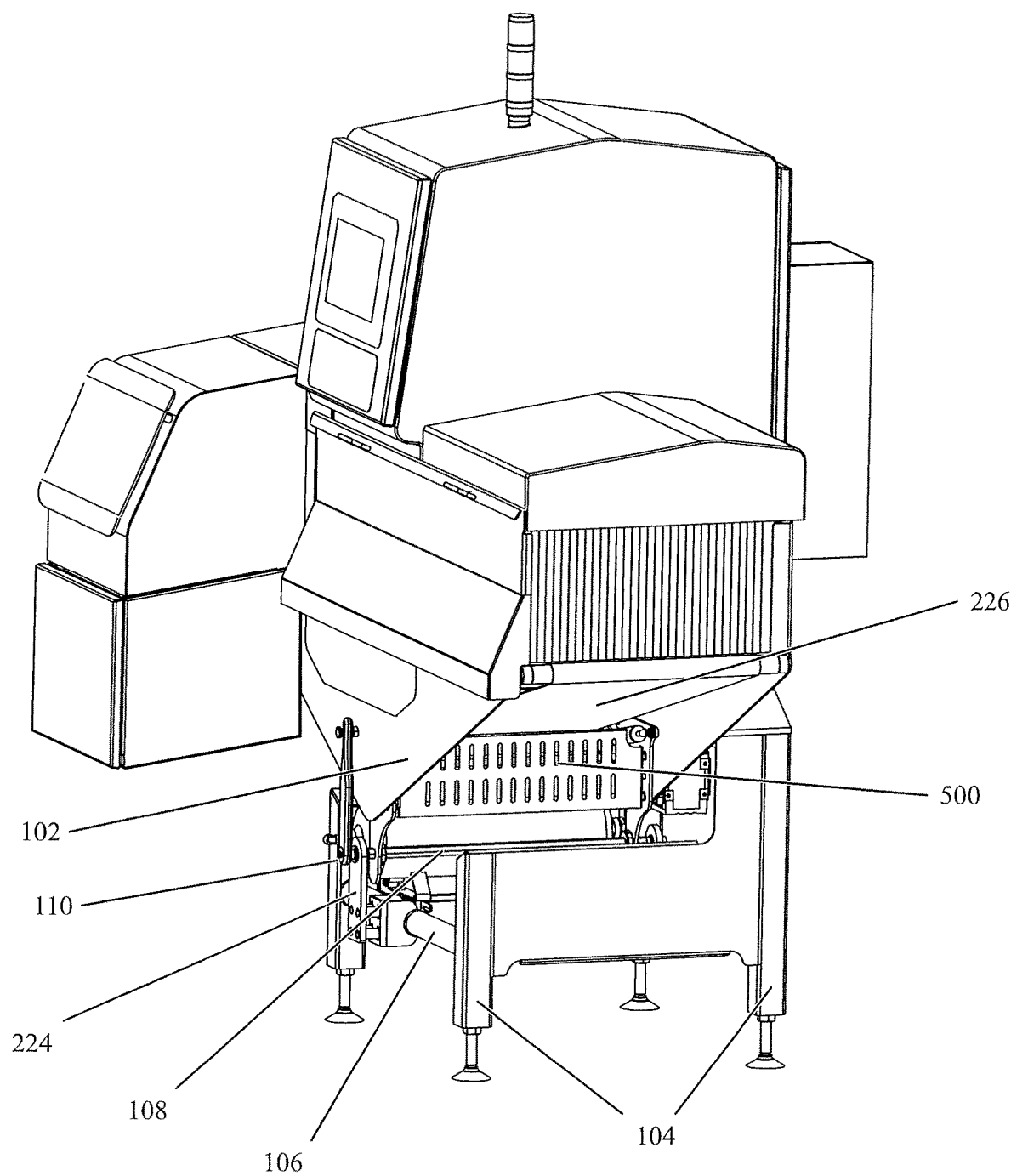
FIG. 5 shows an exemplary isometric view of an embodiment of the apparatus with an embodiment of the carriage in an exemplary engaged position and with an embodiment of the safety guard in place.
Figure 6:
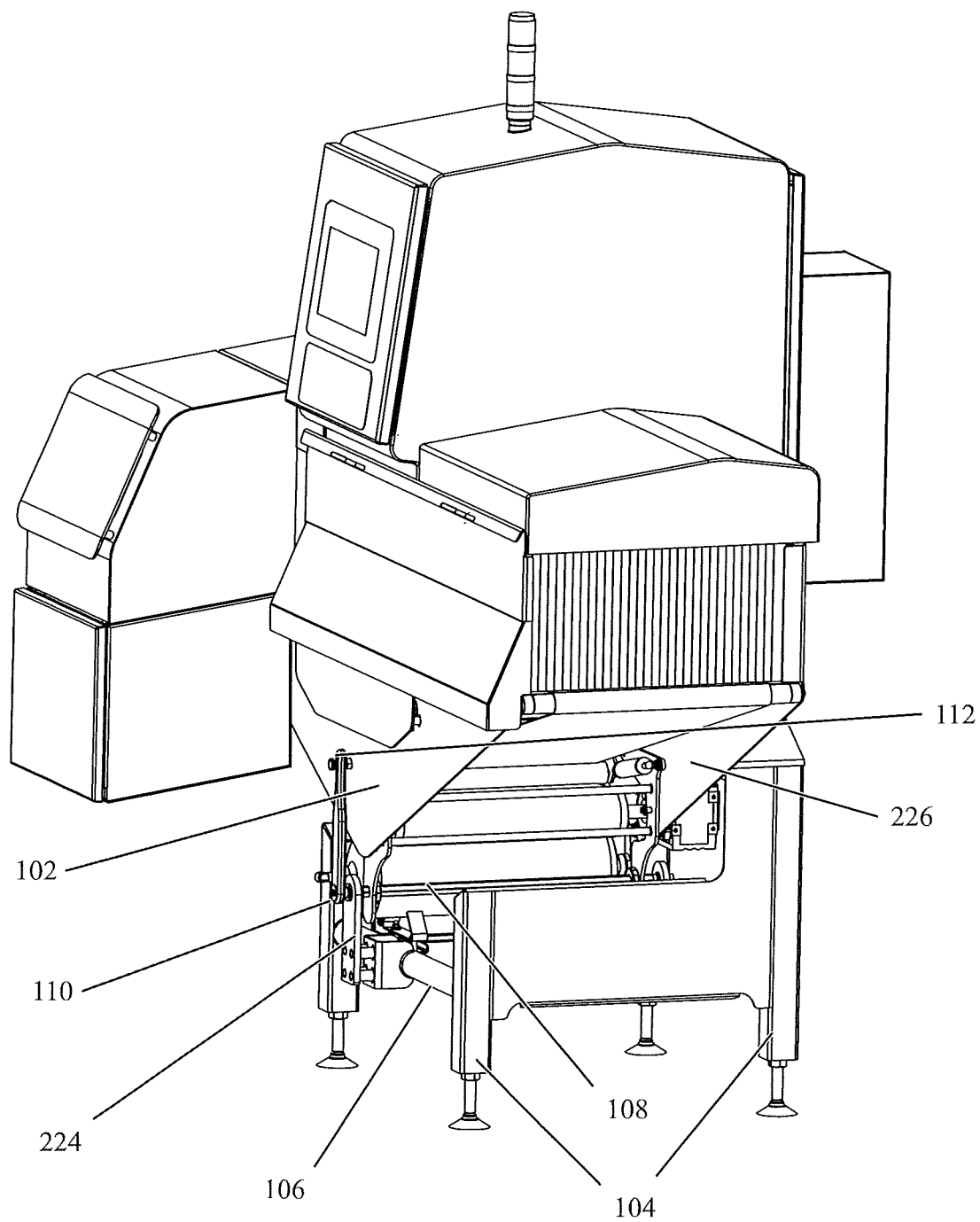
FIG. 6 shows an exemplary isometric view of an embodiment of the apparatus with an embodiment of the carriage in an exemplary engaged position and with an embodiment of the safety guard not in place.

Referring to FIGS. 1-6, embodiments of the apparatus can include a frame 100 configured to support a conveyor system 200 having a conveyor belt 202. The conveyor belt 202 can be a flat belt, a modular belt, a cleated belt, etc. The conveyor belt 202 can be made from polymer, plastic, rubber, nylon, metal, fabric, etc. It is contemplated for the conveyor belt 202 to be of a seamless closed-loop configuration. The conveyor system 200 can include a conveyor bed 102 configured to house a conveyor drive roller 204 (operated by a motor 206) and the conveyor belt 202 such that each of the conveyor drive roller 204 and the conveyor belt 202 occupy a volume of space inside the conveyor bed 102. For instance, the conveyor belt 202 can be routed about the conveyor drive roller 204 and at least one conveyor guide roller 208 so that as the conveyor drive roller 204 acts upon the conveyor belt 202, the conveyor belt 202 moves about a loop formed by belt 202 following a path defined by the conveyor drive roller 204 and at least one conveyor guide roller 208. It is contemplated for the conveyor system 200 to be used in conjunction with an inspection unit 210 so that when articles or objects are placed on the conveyor belt 202, the objects will be passed through an inspection field 212 of the inspection unit 210. The conveyor bed 102 can be a structure that contains the conveyor drive roller 204 and the conveyor belt 202, and it may contain at least a portion of the inspection unit 210.

The frame 100 can be configured to support the conveyor system 200 in a manner that allows the frame 100 to occupy a volume of space outside of the conveyor bed 102. The frame 100 can be a structure having at least one leg 104 and at least one support beam 106. In some embodiments, the support beam 106 can span across two of the legs 104. This can include the support beam 106 extend perpendicularly (or at some other angle) from one leg 104 to another leg 104. As a non-limiting example, the frame 100 can include a first leg 104, a second leg 104, a third leg 104, and a fourth leg 104. Each of the first leg 104, the second leg 104, the third leg 104, and the fourth leg 104 can be configured to rest upon the ground, extend up from the ground, and support the conveyor system 200. A first support beam 106 can extend from the first leg 104 to the second leg 104. A second support beam 106 can extend from the third leg 104 to the fourth leg 104. In some embodiments, the first support beam 106 can run parallel with the second support beam 106. In some embodiments, the legs 104 can be fastened to the conveyor bed 102. This can include being integral to the conveyor bed 102, welded to the conveyor bed 102, bolted to the conveyor bed 102, etc.

The apparatus can include a carriage 108 configured to support a conveyor tension roller 214, the carriage 108 being fastened to the frame 100 to allow the carriage 108 to be transitioned to and from an engaging position and a disengaging position. As noted herein, embodiments of the conveyor system 200 include a conveyor bed 102 configured to house the conveyor drive roller 204 and the conveyor belt 202 such that each of the conveyor drive roller 204 and the conveyor belt 202 occupy a volume of space inside the conveyor bed 102. The conveyor belt 202 can be routed about a conveyor drive roller 204 and at least one conveyor guide roller 208 so that as the conveyor drive roller 204 acts upon the conveyor belt 202, the conveyor belt 202 loops about the conveyor drive roller 204 and at least one conveyor guide roller 208. The conveyor tension roller 214, when in the engaging position, makes contact with the conveyor belt 202 (which can include imposing a tensioning force on the conveyor belt 202). Thus, during operation, the conveyor drive roller 204 acts upon the conveyor belt 202 so that the conveyor belt 202 loops about the conveyor drive roller 204 and at least one conveyor guide roller 208 while the conveyor belt 202 is held in place (e.g., maintains the loop) via the conveyor tension roller 214 making contact therewith. Moreover, the tension imposed on the conveyor belt 202 by the conveyor tension roller 214 can be controlled via the movement of the carriage 108. In addition, or in the alternative, a tensioner means 216 can be used to control tension imposed on the conveyor belt 202.

The carriage 108 can include an arm 218 having an arm first end 220 and an arm second end 222. The arm first end 220 can be fastened to the frame 100. The arm second end 222 can be configured to support the conveyor tension roller 214. In some embodiments, the carriage 108 is fastened to a cantilever 224 extending from the support beam 106 of the frame 100. Some embodiments can include plural cantilevers 224. As a non-limiting example, a first cantilever 224 can extend from the first support beam 106 and a second cantilever 224 can extend from the second support beam 106. The arm first end 220 can be fastened to the first cantilever 224 and to the second cantilever 224. It will be appreciated with the benefit of the present disclosure that any number of cantilevers 224 can be used for an arm 218. In addition, any number of arms 218 can be fastened to any number of cantilevers 224.

In some embodiments, the engaging position can be a position at which the conveyor tension roller 214 will contact with the conveyor belt 202 when installed, and the disengaging position can be a position at which the conveyor tension roller 214 will not make contact with the conveyor belt 202 when installed. Being installed can be defined as the carriage 108 being fastened to the frame 100 or cantilever 224. For instance, the carriage 108 can be configured to be transitioned about the frame 100 to and from an engaging position and a disengaging position by moving the arm 218 relative to the cantilever 224 to cause the conveyor tension roller 214 supported by the arm second end 222 to make contact (engaging position) with the conveyor belt 202 or not make contact (disengaging position) with the conveyor belt 202. The engaging position can be a position at which the conveyor tension roller 214 will be within the volume of space inside the conveyor bed 102. The disengaging position can be a position at which the conveyor tension roller 214 will be within the volume of space outside the conveyor bed 102.

As noted herein, embodiments of the conveyor system 200 can rest upon or be supported by the legs 104 of the frame 100 so that the support beam 106 is located at a distance from the conveyor belt 202. The conveyor belt 202 can be part of a conveyor belt drive component that is supported above the carriage 108 via the legs 104. The arm 218 can be a C-shaped or J-shaped member that, when transitioned to the engaging position, causes the arm second end 222 and the conveyor tension roller 214 to move upwards (e.g., away from the ground) and towards the conveyor belt 202 to make contact with the conveyor belt 202. When transitioned to the engaging position, the arm second end 222 and the conveyor tension roller 214 to move downwards (e.g., towards the ground) and away from the conveyor belt 202. In some embodiments, the engaging position can include imposing a tensioning force on the conveyor belt 202 so that the conveyor belt will be taut within the conveyor belt drive component. The disengaging position can include removing the tensioning force on the conveyor belt 202 so that the conveyor belt 202 will be slacked within the conveyor belt drive component.

It is contemplated for the apparatus to be used for maintaining a conveyor system 200 having a removable conveyor belt 202. Maintenance can involve removal of the conveyor belt 202. As noted herein, embodiments of the conveyor system 200 can have a conveyor bed 102 configured to house the conveyor belt 202. With known conveyor systems, the conveyor belt and the tension roller is housed within the conveyor bed. In order to maintain the conveyor belt of known systems, the conveyor tensioner has to be disassembled or removed from the conveyor system. This can further require gaining access to the volume of space inside the conveyor bed or even disassembling the conveyor bed. With embodiments of the disclosed apparatus, however, a user need only transition the carriage 108 from the engaging position to the disengaging position to maintenance the conveyor belt 202. With the carriage 108 in the engaging position, the conveyor tension roller 214 is within the volume of space inside the conveyor bed 102. Transitioning the carriage 108 to the engaging position involves causing the conveyor tension roller 214 to extend through an opening 226 of the conveyor bed 102. A simple transitioning of the carriage 108 to the disengaging position causes the conveyor tension roller 214 to be within the volume of space outside the conveyor bed 102 by forcing the conveyor tension roller 214 to move out through the opening 226 in the conveyor bed 102. Transitioning the carriage 108 to the disengaging can involve removing the tensioning force on the conveyor belt so that the conveyor belt 202 will be slacked within the conveyor system 200. Transitioning the carriage 108 to the disengaging position can further involve generating a volume of space between the conveyor bed 102 and the conveyor tension roller 214 that will accommodate attachment or detachment of the conveyor belt 202 to and from the conveyor system 200. In other words, a user would not need to access the inside of the conveyor bed 102, but rather use the volume of space generated between the conveyor bed 102 and the conveyor tension roller 214 to access the slacked conveyor belt 202 and draw the conveyor belt 202 into that generated volume of space. The conveyor belt 202 can then be detached from the rollers of the conveyor belt drive component. The detaching of the conveyor belt 202 from the conveyor system 200 can be achieved without detaching the carriage 108 from the frame 100 or detaching the conveyor tension roller 214 from the carriage 108.

Some embodiments can include a safety guard 500 configured to selectively cover the opening 226. The safety guard 500 can be a plate or cover pivotally or removably attached to a portion of the conveyor bed 102. When the safety guard 500 is in place, it can prevent ingress to the volume of space inside of the conveyor bed 500 via the opening 500.

In some embodiments, the frame 100 can be configured to support an inspection unit 210. This can include an inspection unit 210 configured to inspect of articles or objects in production lines, packaging lines, etc. For instance, the inspection unit 210 can be configured to detect foreign objects and contaminants in food products, pharmaceutical products, integrated circuit products, etc. As noted herein, the conveyor system 200 can be used in conjunction with an inspection unit 210 so that when articles or objects are placed on the conveyor belt 202, the objects will be passed through an inspection field 212 of an inspection unit 210. This can be done for quality control, identification of objects, segmentation of objects, etc.

Some embodiments can include the apparatus in combination with an inspection unit 210 and a conveyor system 200 mounted to the frame 100. For instance, the conveyor system 200 can be configured to route the conveyor belt 202 about the conveyor drive roller 204 and at least one conveyor guide roller 208 so that at least a portion of the conveyor belt 202 passes through an inspection field 212 of an inspection unit 210. The inspection unit 210 can be located within or on a portion of the conveyor bed 102. The inspection unit 210 can be located above or below the conveyor belt 212. As will be explained below, embodiments of the inspection unit 210 can include a radiation generator 228. While it is contemplated for the inspection unit 210 to be located on a side of the conveyor belt 212 that is opposite the side the radiation generator 228 is located, the radiation generator 228 can be positioned on the same side of the conveyor belt 212 as the inspection unit 210.

In some embodiments, the inspection unit 210 can be a product inspection apparatus. In at least one embodiment, the inspection unit 210 can be configured to use radiation to gather information about the objects as they pass through the inspection field 212. The radiation can be generated by a radiation generator 228 and the radiation, after interacting with the objects (reflecting, scattering, etc.), can then be captured and analyzed by the inspection unit 210. The radiation generator 228 can be located within or on a portion of the conveyor bed 102. The radiation generator 228 can be located above or below the conveyor belt 212. As a non-limiting example, the conveyor system 200 can be segmented into an infeed compartment, an inspection compartment, and an outfeed compartment. The conveyor belt 202 can carry the arriving objects through the infeed compartment, through the inspection compartment, and through the outfeed compartment. In the inspection compartment, a radiation generator 228 can be arranged at some distance above or below the conveyor belt 202, while an inspection unit 210 can be arranged immediately underneath or above the conveyor belt 202. Thus, an object travelling on the conveyor belt 202 can be traversed by the radiation from the radiation generator 228, and the rays transmitted by the object and/or the conveyor belt 202 can be received by the inspection unit 210.

In some embodiments, the product inspection apparatus can be configured to utilize any one or combination of visible light radiation, infrared radiation, ultraviolet radiation, x-ray radiation, electromagnetic radiation, or gamma ray radiation. It should be noted that some forms of radiation can be harmful to humans, and thus protection shields, curtains, etc. can be used to prevent stray radiation from being emitted to an environment outside of the inspection field 212.

In some embodiments, the conveyor system 200 can include a conveyor belt drive component. The conveyor belt drive component can be the conveyor drive roller 204, the motor operating the conveyor drive roller 204, the controller to control the operation of the conveyor system 200, etc. The engaging position can be selected to impose a tensioning force on the conveyor belt 202. For instance, the carriage 108 can be configured so that the conveyor tension roller 214 imposes a tensioning force when it makes contact with the conveyor belt 202 via being transitioned to the engaging position. This can result in the conveyor belt 202 being taut within the conveyor belt drive component. The disengaging position can be selected to release the tensioning force on the conveyor belt 202. For instance, the carriage 108 can be configured so that the conveyor tension roller 214 releases the tensioning force when it breaks contact with the conveyor belt 202 via being transitioned to the disengaging position. This can result in the conveyor belt 202 being slacked within the conveyor belt drive component.

Some embodiments of the apparatus can include pivot means 110 for rotational motion of the carriage 108, wherein the carriage 108 is connected to the frame 100 via the pivot means 110. The pivot means 110 can be a hinge assembly, a bearing and race assembly, a ball and socket arrangement, a rack and pinion assembly, a gimbal assembly, etc. The pivot means 110 can allow the carriage 108 to rotate about the frame 100 or the cantilever 224. The rotation can be rotating about the pivot means 110 to allow the conveyor tension roller 214 to move upwards (e.g., away from the ground or towards the conveyor belt 202) and move downwards (e.g., towards the ground or away from the conveyor belt 202).

In some embodiments, the conveyor belt 202 can include an inside track 230 and an outside track 232. The conveyor belt drive component can include a conveyor drive roller 204 configured to engage the inside track 230 of the conveyor belt 202. For instance, the conveyor belt 202 can be routed about a conveyor drive roller 204 and at least one conveyor guide roller 208 so that the conveyor drive roller 204 acts upon the conveyor belt 202 inside track 230 to cause the conveyor belt 202 to loop about the conveyor drive roller 204 and at least one conveyor guide roller 208. This loop can allow objects placed on the conveyor belt 202 outside track 232 to pass through the inspection field 212 of the inspection unit 210. The carriage 108 can be configured to rotate about the pivot means 110 so that the carriage 108 will transition to the engaging position and cause the conveyor tension roller 214 to make contact with the outside track 232 of the conveyor belt 202.

Some embodiments of the apparatus can include a locking means 112 for securing the carriage 108 in the engaging position or the disengaging position. The locking means 112 can be a pin and hole arrangement, a pin and detent arrangement, a ratchet arrangement, etc. For instance, the carriage 108 can include a lever 114 extending from the carriage 108. The lever 114 can be a hand lever configured to allow for manual actuation of the carriage 108. The lever 114 can have a pin/hole or a pin/detent that corresponds with a hole/pin or detent/pin located on the conveyor bed 102 or frame 100. The carriage 108 can be locked in place by aligning the pin/hole or a pin/detent of the lever 114 with a corresponding hole/pin or detent/pin of the conveyor bed 102 or frame 100. This can facilitate locking the carriage 108 in a position that corresponds to the engaging position or the disengaging position.

Some embodiments of the apparatus can include a tensioner means 216 for applying the tensioning force when the carriage 108 is in the engaging position. As noted herein, the tension imposed on the conveyor belt 202 by the conveyor tension roller 214 can be controlled via the movement of the carriage 108 and/or via a tensioner means 216. The tensioner means 216 can be a spring assembly, a hydraulic piston assembly, a pneumatic piston assembly, etc. attached to the carriage 108. This can include being attached to the arm second end 222 so that the tensioner means 216 acts upon the conveyor tension roller 214. As the carriage 108 is transitioned to the engaging position, the conveyor tension roller 214 can make contact with the conveyor belt 202. The carriage 108 can then be urged further to cause the tensioner means 216 to act upon the conveyor tension roller 214 so as to generate a tensioning force on the conveyor belt 202. In addition, or in the alternative, the tensioner means 216 can be adjusted to act upon the conveyor tension roller 214 so as to generate a tensioning force on the conveyor belt 202. The spring/hydraulic/pneumatic nature of the tensioner means 216 can facilitate adjustment of the tensioning force.

Some embodiments of the apparatus can include a motor 116 configured to actuate the carriage 108. The motor 116 can be an electric motor with a controller (e.g., a processor and/or encoder) to control movement of the carriage 108.

Embodiments can include an inspection system having an inspection unit 210. The inspection system can include a conveyor system 200 having a conveyor bed 102 configured to house a conveyor drive roller 204 and a conveyor belt 202 such that each of the conveyor drive roller 204 and the conveyor belt 202 occupy a volume of space inside the conveyor bed 102. The conveyor system 200 can be configured so that objects placed on the conveyor belt 202 will be passed through an inspection field of the inspection unit 210. The inspection system can include a frame 100 configured to support the conveyor system 200, the frame 100 occupying a volume of space outside of the conveyor bed 102. The inspection system can include a carriage 108 configured to support a conveyor tension roller 214, the carriage 108 being fastened to the frame 100 to allow the carriage 108 to be transitioned to and from an engaging position and a disengaging position. In some embodiments, the engaging position can be a position at which the conveyor tension roller 214 will be within the volume of space inside the conveyor bed 102 when installed. In some embodiments, the disengaging position can be a position at which the conveyor tension roller 214 will be within the volume of space outside the conveyor bed 102 when installed.

Some embodiments of the inspection system can include the frame 100 being attached to the conveyor bed 102.

Some embodiments of the inspection system can include a conveyor belt drive component having the conveyor drive roller 204 and a guide roller 208. The engaging position can be selected to impose a tensioning force on the conveyor belt 202. The disengaging position can be selected to release the tensioning on the conveyor belt 202.

The inspection system can include pivot means 110 for rotational motion of the carriage 108, wherein the carriage 108 is connected to the frame 100 via the pivot means 110.

Some embodiments of the inspection system can include conveyor belt 202 having an inside track 230 and an outside track 232. The conveyor drive roller 204 can be configured to engage the inside track 230 of the conveyor belt 202. The carriage 108 can be configured to rotate about the pivot means 110 so that the carriage 108 will transition to the engaging position and cause the conveyor tension roller 214 to make contact with the outside track 232.

Embodiments can include a method for maintaining an apparatus having a removable conveyor belt 202, wherein the apparatus includes a frame 100 having a carriage 108 with a conveyor tension roller 214, the frame 100 being configured to support a conveyor system 200, the conveyor system 200 having a conveyor bed 102 configured to house a conveyor drive roller 204 and the removable conveyor belt 202. The method can involve transitioning the carriage 108 to an engaging position via a pivot motion about the frame 100 to impose a tensioning force on the conveyor belt 202. Transitioning the carriage 108 to an engaging position can involve causing the conveyor tension roller 214 to move from a volume of space outside of the conveyor bed 102 to a volume of space inside of the conveyor bed 102.

Some embodiments of the method can involve transitioning the carriage 108 to a disengaging position via the pivot motion about the frame 100 to release the tensioning force on the conveyor belt 202. Transitioning the carriage 108 to a disengaging position can involve causing the conveyor tension roller 214 to move from a volume of space inside of the conveyor bed 102 to a volume of space outside of the conveyor bed 102.

Some embodiments of the method can involve generating a volume of space between the conveyor bed 102 and the conveyor tension roller 214 to accommodate attachment or detachment of the conveyor belt 202 to and from the conveyor system 200. For instance, when transitioning the carriage 108 to a disengaging position, the conveyor tension roller 214 can move to a volume of space outside of the conveyor bed 102 such that there is enough distance between the conveyor tension roller 214 and the conveyor bed 102 to allow a user to easily gain access to a slacked portion of the conveyor belt 202 without having to gain access to the volume of space within the conveyor bed 102.

Some embodiments of the method can involve detaching of the conveyor belt 202 from the conveyor system 200 without detaching the carriage 108 from the frame 100 or detaching the conveyor tension roller 214 from the carriage 108.

It will be understood that modifications to the embodiments disclosed herein can be made to meet a particular set of design criteria. For instance, any of frames 100, carriages 108, pivot means 110, conveyor tension rollers 214, locking means 112, tensioner means 216, motors 116, conveyor systems 200, inspection units 210, or any other component can be any suitable number or type of each to meet a particular objective. Therefore, while certain exemplary embodiments of the apparatus and methods of using and making the same have been discussed and illustrated, it is to be distinctly understood that the invention is not limited thereto but can be otherwise variously embodied and practiced within the scope of the following claims.

It will be appreciated that some components, features, and/or configurations can be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiment. Thus, the components, features, and/or configurations of the various embodiments can be combined together in any manner and such combinations are expressly contemplated and disclosed by this statement.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein. Additionally, the disclosure of a range of values is a disclosure of every numerical value within that range, including the end points.

What is claimed is:

1. An apparatus, comprising:
   a frame configured to support a conveyor system having a conveyor belt; and
   a carriage configured to support a conveyor tension roller, the carriage being fastened to the frame to allow the carriage to be transitioned to and from an engaging position and a disengaging position; and
   a motor configured to actuate the carriage to and from the engaging position and the disengaging position;
   wherein the engaging position is a position at which the conveyor tension roller will contact with the conveyor belt when installed, and the disengaging position is a position at which the conveyor tension roller will not make contact with the conveyor belt when installed.

2. The apparatus recited in claim 1, wherein the frame is configured to support an inspection unit.

3. The apparatus recited in claim 2, in combination with:
   an inspection unit and a conveyor system mounted to the frame.

4. The apparatus recited in claim 3, wherein the inspection unit is a product inspection apparatus.

5. The apparatus recited in claim 4, wherein the product inspection apparatus is configured to utilize any one or combination of visible light radiation, infrared radiation, ultraviolet radiation, x-ray radiation, electromagnetic radiation, or gamma ray radiation.

6. The apparatus recited in claim 3, wherein:
   the conveyor system includes a conveyor belt drive component;
   the engaging position is selected to impose a tensioning force on the conveyor belt; and
   the disengaging position is selected to release the tensioning force on the conveyor belt.

7. The apparatus recited in claim 6, comprising:
   pivot means for rotational motion of the carriage, wherein the carriage is connected to the frame via the pivot means.

8. The apparatus recited in claim 7, wherein:
   the conveyor belt includes an inside track and an outside track;
   the conveyor belt drive component includes a conveyor drive roller configured to engage the inside track of the conveyor belt; and
   the carriage is configured to rotate about the pivot means so that the carriage will transition to the engaging position and cause the conveyor tension roller to make contact with the outside track.

9. The apparatus recited in claim 1, comprising:
   locking means for securing the carriage in the engaging position or the disengaging position.

10. The apparatus recited in claim 6, comprising:
    tensioner means for applying the tensioning force when the carriage is in the engaging position.

11. An inspection system, comprising:
    an inspection unit;
    a conveyor system including a conveyor bed configured to house a conveyor drive roller and a conveyor belt such that each of the conveyor drive roller and the conveyor belt occupy a volume of space inside the conveyor bed, wherein the conveyor system is configured so that objects placed on the conveyor belt will be passed through an inspection field of the inspection unit;
    a frame configured to support the conveyor system, the frame occupying a volume of space outside of the conveyor bed; and
    a carriage configured to support a conveyor tension roller, the carriage being fastened to the frame to allow the carriage to be transitioned to and from an engaging position and a disengaging position, wherein:
      the engaging position is a position at which the conveyor tension roller will be within the volume of space inside the conveyor bed when installed; and
      the disengaging position is a position at which the conveyor tension roller will be within the volume of space outside the conveyor bed when installed; and
    a motor configured to actuate the carriage to and from the engaging position and the disengaging position.

12. The inspection system recited in claim 11, wherein the frame is attached to the conveyor bed.

13. The inspection system recited in claim 11, comprising:
    a conveyor belt drive component including the conveyor drive roller and a guide roller; and
    wherein the engaging position is selected to impose a tensioning force on the conveyor belt; and
    wherein the disengaging position is selected to release the tensioning on the conveyor belt.

14. The inspection system recited in claim 11, comprising:
    pivot means for rotational motion of the carriage, wherein the carriage is connected to the frame via the pivot means.

15. The inspection system recited in claim 11, wherein:
    the conveyor belt includes an inside track and an outside track;
    the conveyor drive roller is configured to engage the inside track of the conveyor belt; and
    the carriage is configured to rotate about the pivot means so that the carriage will transition to the engaging position and cause the conveyor tension roller to make contact with the outside track.

16. A method for maintaining an apparatus having a removable conveyor belt, wherein the apparatus includes a frame having a carriage with a conveyor tension roller, the frame being configured to support a conveyor system, the conveyor system having a conveyor bed configured to house a conveyor drive roller and the removable conveyor belt, the method comprising:
    transitioning the carriage via a motor to an engaging position via a pivot motion about the frame to impose a tensioning force on the conveyor belt.

17. The method recited in claim 16, comprising:
transitioning the carriage to a disengaging position via the pivot motion about the frame to release the tensioning force on the conveyor belt.

18. The method recited in claim 17, comprising:
generating a volume of space between the conveyor bed and the conveyor tension roller to accommodate attachment or detachment of the conveyor belt to and from the conveyor system.

19. The method recited in claim 18, comprising:
detaching of the conveyor belt from the conveyor system without detaching the carriage from the frame or detaching the conveyor tension roller from the carriage.

\* \* \* \* \*